US006212016B1

United States Patent
Abe

(10) Patent No.: US 6,212,016 B1
(45) Date of Patent: Apr. 3, 2001

(54) TELESCOPIC OBJECTIVE LENS SYSTEM

(75) Inventor: Tetsuya Abe, Hokkaido (JP)

(73) Assignee: Asahi Kogako Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/300,257

(22) Filed: Apr. 27, 1999

(30) Foreign Application Priority Data

Apr. 28, 1998 (JP) .................................................. 10-118560

(51) Int. Cl.[7] .................................................. G02B 15/02
(52) U.S. Cl. .......................... 359/675; 359/672; 359/793; 359/794; 359/795; 359/827
(58) Field of Search .................................. 359/672, 675, 359/793–795, 827

(56) References Cited

U.S. PATENT DOCUMENTS

| 4,206,971 | * | 6/1980 | Hamanishi et al. | 359/675 |
| 4,239,340 | * | 12/1980 | Ogino | 359/675 |
| 4,394,071 | * | 7/1983 | Yamada | 359/675 |
| 4,653,870 | * | 3/1987 | Imaizumi et al. | 359/675 |
| 4,768,868 | * | 9/1988 | Wakamiya et al. | 359/754 |
| 4,830,473 | * | 5/1989 | Kudo | 359/675 |
| 5,082,360 | * | 1/1992 | Sato et al. | 359/675 |
| 5,589,976 | | 12/1996 | Kanai et al. | 359/362 |
| 5,729,390 | | 3/1998 | Abe | 359/661 |

FOREIGN PATENT DOCUMENTS 57-93309   6/1982  (JP).

* cited by examiner

Primary Examiner—Georgia Epps
Assistant Examiner—Evelyn A. Lester
(74) Attorney, Agent, or Firm—Greenblum & Bernstein, P.L.C.

(57) ABSTRACT

A telescopic objective lens system comprises a positive first lens group and a second lens group, in this order from the object. The second lens group comprises a first sub-lens group and a second sub-lens group, wherein the first sub-lens group is combined with the first lens group to be used for correcting axial chromatic aberration, the second sub-lens group is combined with the first lens group to be used for correcting field curvature; and wherein the combination of the first lens group and the first sub-lens group, and the combination of the first lens group and the second sub-lens group can be alternatively selected.

10 Claims, 7 Drawing Sheets

Fig. 1
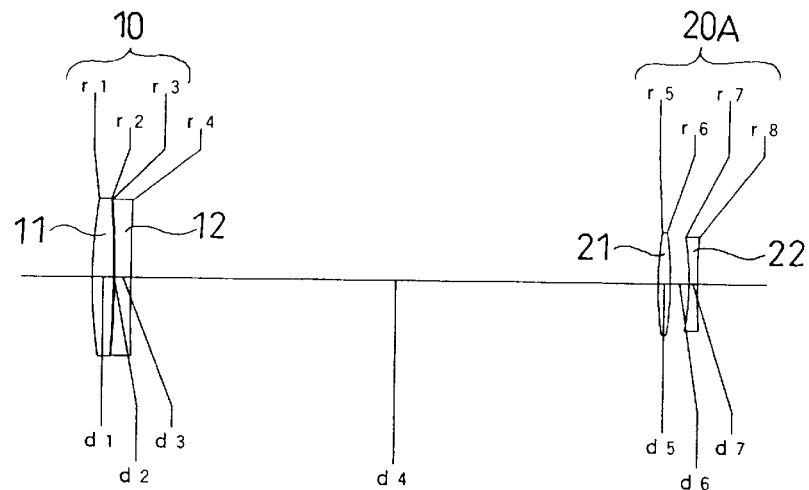
Fig. 2A    Fig. 2B    Fig. 2C    Fig. 2D
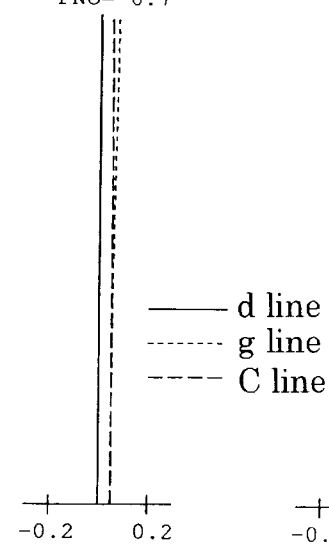
SPHERICAL
ABERRATION
CHROMATIC
ABERRATION
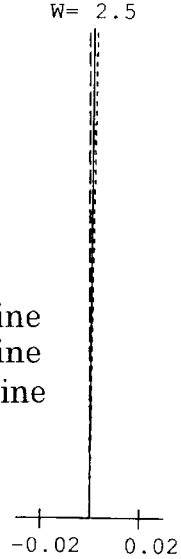
LATERAL
CHROMATIC
ABERRATION
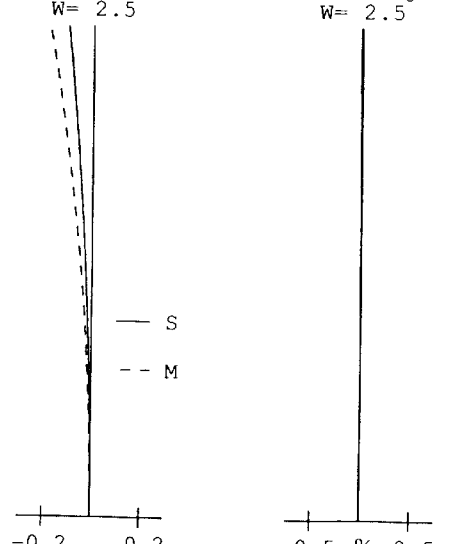
ASTIGMATISM
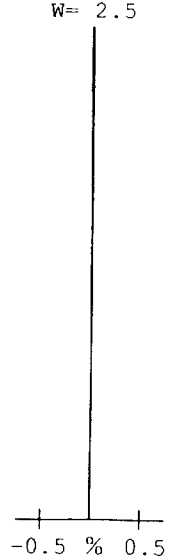
DISTORTION Fig. 3
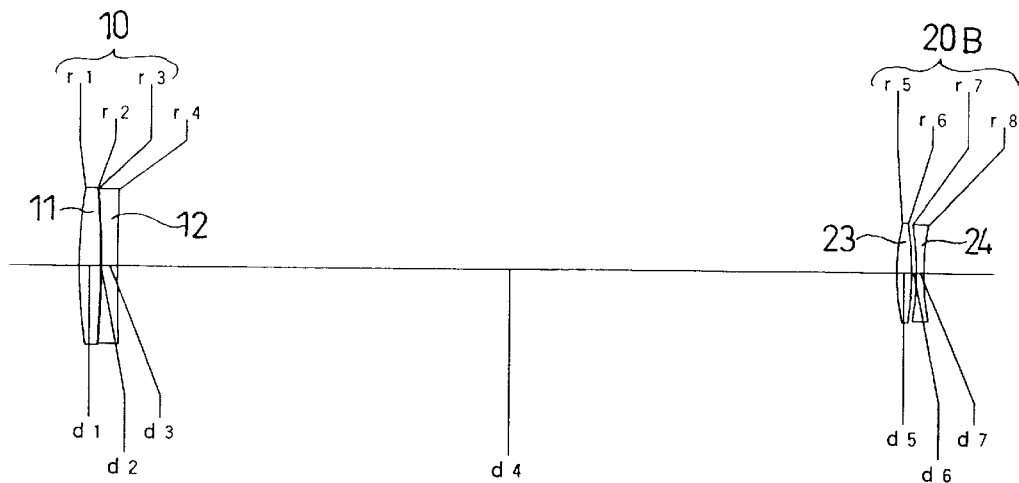
Fig. 4A  Fig. 4B  Fig. 4C  Fig. 4D
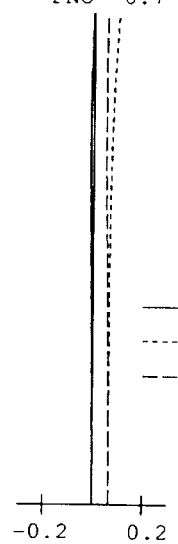
SPHERICAL
ABERRATION
CHROMATIC
ABERRATION
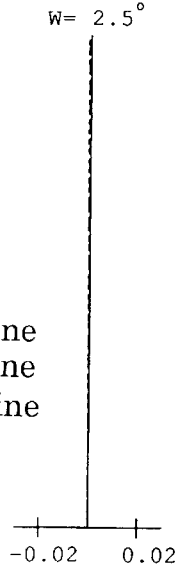
LATERAL
CHROMATIC
ABERRATION
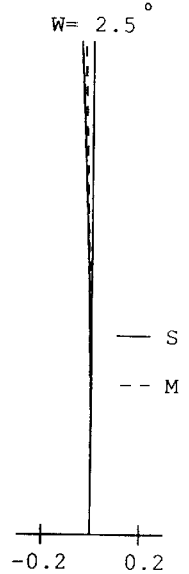
ASTIGMATISM
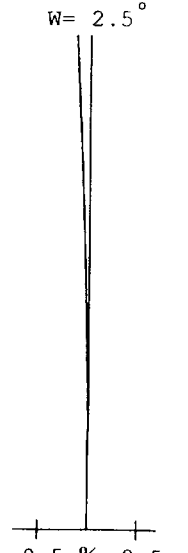
DISTORTION Fig. 5
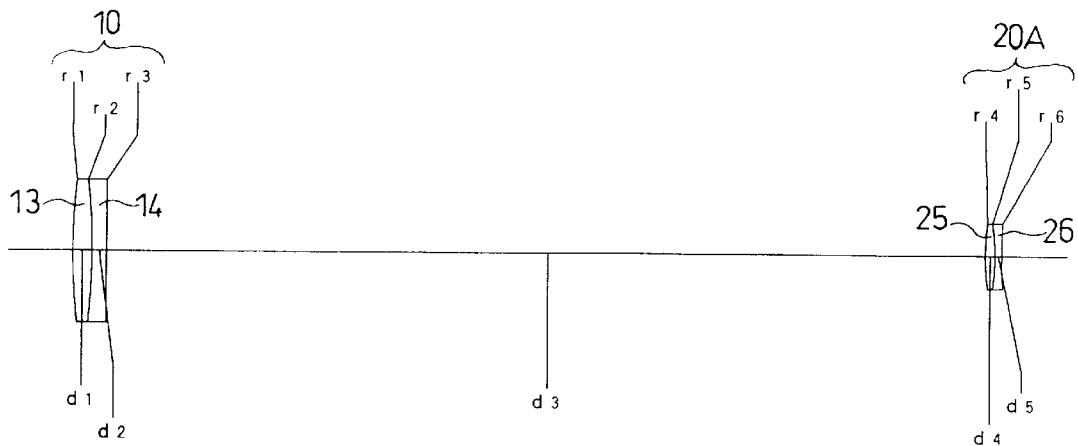
Fig. 6A    Fig. 6B    Fig. 6C    Fig. 6D
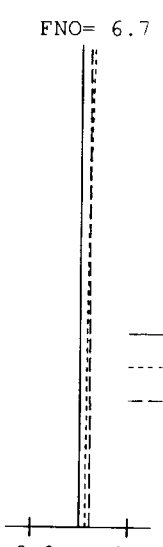
SPHERICAL
ABERRATION
CHROMATIC
ABERRATION
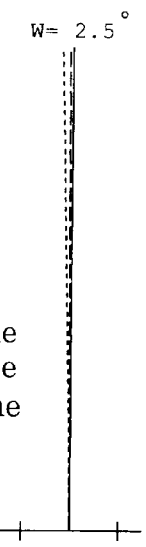
LATERAL
CHROMATIC
ABERRATION
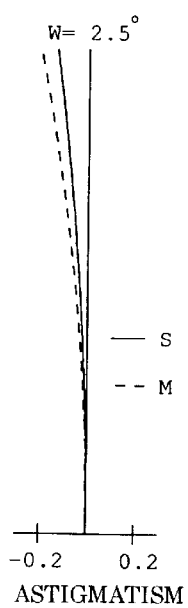
ASTIGMATISM
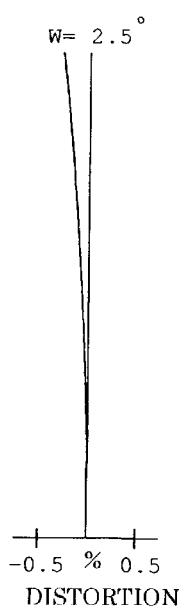
DISTORTION

SPHERICAL ABERRATION

CHROMATIC ABERRATION

LATERAL CHROMATIC ABERRATION

ASTIGMATISM

DISTORTION

SPHERICAL ABERRATION

CHROMATIC ABERRATION

LATERAL CHROMATIC ABERRATION

ASTIGMATISM

DISTORTION

SPHERICAL      LATERAL         ASTIGMATISM      DISTORTION
ABERRATION     CHROMATIC
               ABERRATION
CHROMATIC
ABERRATION

TELESCOPIC OBJECTIVE LENS SYSTEM

BACKGROUND OF THE INVENTION

1. Field of the Invention

The present invention relates to an objective lens system of a telescope, used (for example) in an astronomical telescope and the like, which exhibits optimum optical performance both in an observing mode through the eyepiece, and in a photographing mode to photograph a target object.

2. Description of the Related Art

An optical system, for example, an objective lens system for an astronomical telescope, including a combination of a positive lens element and a negative lens element made of glass materials having different dispersion values, has been widely known and used. An objective lens system of a telescope in general has a long focal length, and it is therefore necessary to correct axial chromatic aberration. In particular, it is essential to correct the secondary spectrum of axial chromatic aberrations at a higher magnification in the observing mode through the eyepiece. In order to correct the above-mentioned secondary spectrum of axial chromatic aberration, there have recently been many attempts to employ fluorite and low dispersion special glass to form a positive lens element. However, these prior arts have caused an increase in cost because a positive lens element in the first lens group having a large-diameter has to be made of an expensive glass material such as fluorite or low dispersion special glass and the like.

On the other hand, along with an increase in popularity of astronomical photography, an objective lens system of an astronomical telescope has been required to have a wider angle-of-view. In connection with this trend, an objective lens system disclosed in Japanese Unexamined Patent Publication No. Sho-57-93309 should be noted as an example. According to this patent publication, by attaching a detachable field-curvature correcting optical system to an objective lens system of an astronomical telescope in which axial chromatic aberrations are sufficiently corrected, the astronomical telescope can be used in both the observing mode through the eyepiece and the photographing mode to photograph a target object. More specifically, a wider angle-of-view required for the photographing mode is attained by positioning a detachable field-curvature correcting lens element in the vicinity of the image plane of the first lens group in which axial chromatic aberrations are sufficiently corrected by the combination of a negative lens element and a positive lens element.

However, the above-explained example has also caused an increase in cost because the field-curvature correcting lens element has to additionally be attached to the first lens group after the axial chromatic aberrations have been sufficiently corrected.

SUMMARY OF THE INVENTION

The object of the present invention is to provide, at low cost, an objective lens system of a telescope in which axial chromatic aberration is sufficiently corrected in an observing mode through the eyepiece, and field curvature attributable to a wider angle-of-view is corrected by a field-curvature correcting lens element in a photographing mode to photograph a target object.

In order to achieve the above-mentioned object, according to the present invention, there is provided a telescopic objective lens system comprises a positive first lens group and a second lens group, in this order from the object. The second lens group comprises a first sub-lens group and a second sub-lens group, wherein the first sub-lens group is combined with the first lens group to be used for correcting axial chromatic aberration, the second sub-lens group is combined with the first lens group to be used for correcting field curvature; and wherein the combination of the first lens group and the first sub-lens group, and the combination of the first lens group and the second sub-lens group can be alternatively selected.

As a mechanical structure, the first lens group is formed as a first lens unit, the first sub-lens group is formed as a first sub-lens unit, and the second sub-lens group is formed as a second sub-lens unit, wherein detachable coupling mechanisms are preferably provided on the image-side of the first lens unit, and on the object-side of both the first sub-lens unit and the second sub-lens unit. Furthermore, it is preferable to constitute each of the first lens group, the first sub lens group and the second sub-lens group by a single positive lens element and a single negative lens element.

Each of the first lens group and the first sub-lens group of the telescopic objective lens system according to the present invention is composed of a positive lens element and a negative lens element which are made of glass materials having different dispersion values, and the telescopic objective lens system satisfies the following conditions:

$$\nu_{I+} < 80 \quad (1)$$

$$\nu_{II+} > 70 \quad (2)$$

$$1.1 < f_I/f < 2.0 \quad (3)$$

wherein $\nu_{I+}$ designates the Abbe number of the glass material forming the positive lens element in the first lens group;

$\nu_{II+}$ designates the Abbe number of the glass material forming the positive lens element in the second lens group;

$f_I$ designates the focal length of the first lens group;

$f$ designates the focal length of the entire lens system.

The first lens group and the second sub-lens group of the telescopic objective lens system according to the present invention is composed of a positive lens element and a negative lens element which are made of glass materials having different dispersion values, and the telescopic objective lens system satisfies the following conditions:

$$n_{II+} > 1.55 \quad (4)$$

$$n_{II-}/n_{II+} < 1.0 \quad (5)$$

wherein $n_{II+}$ designates the refractive index, with respect to the d line, of the positive lens element in the second lens group;

$n_{II-}$ designates the refractive index, with respect to the d line, of the negative lens element in the second lens group.

The present disclosure relates to subject matter contained in Japanese Patent Application No. 10-118560 (filed on Apr. 28, 1998) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement of the first embodiment of the present invention in which the combination of the common first lens group and the first sub-lens group for correcting chromatic aberration is shown;

FIGS. 2A, 2B, 2C and 2D are aberration diagrams of the lens arrangement of FIG. 1;

FIG. 3 is a lens arrangement of the first embodiment of the present invention in which the combination of the common first lens group and the second sub-lens group for correcting field curvature is shown;

FIGS. 4A, 4B, 4C and 4D are aberration diagrams of the lens arrangement of FIG. 3;

FIG. 5 is a lens arrangement of the second embodiment of the present invention in which the combination of the common first lens group and the first sub-lens group for correcting chromatic aberration is shown;

FIGS. 6A, 6B, 6C and 6D are aberration diagrams of the lens arrangement of FIG. 5;

DESCRIPTION OF THE PREFERRED EMBODIMENTS

Figure 13:
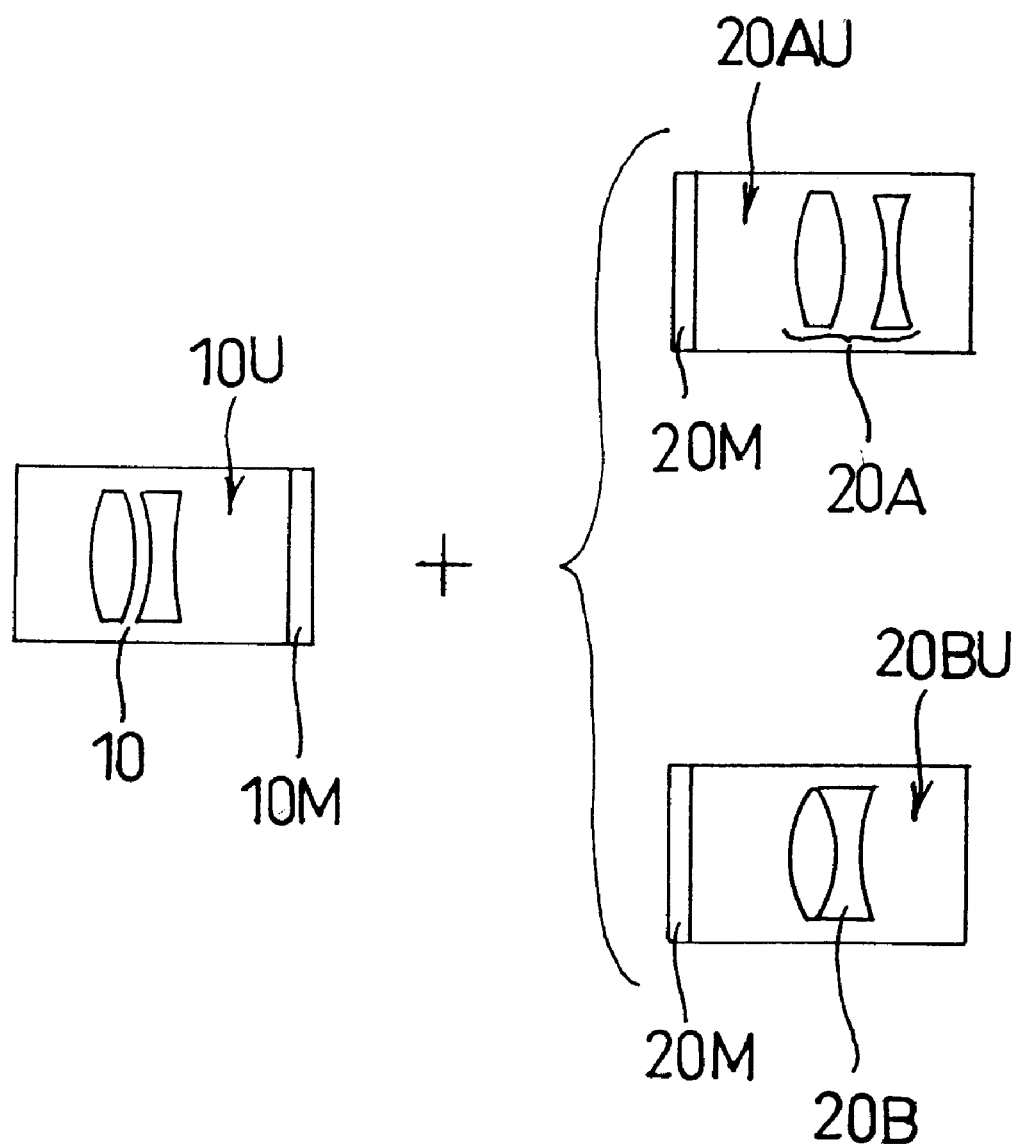
FIG. 13 is a schematic drawing showing two lens combinations which can be alternatively selected: the common first lens group and the first sub-lens group which is used to correct chromatic aberrations, and the common first lens group and the second sub-lens group which is used to correct field curvature.

FIG. 13 is a schematic drawing showing the concept of a telescopic objective lens system. The common first lens group 10 is formed as a first lens unit 10U, a first sub-lens group 20A is formed as a first sub-lens unit 20AU, and a second sub-lens group 20B is formed as a second sub-lens unit 20BU. The lens units have two possible different combinations, i.e., the combination of the first lens unit 10AU and the first sub-lens unit 20AU, in this order from the object, or the combination of the first lens unit 10AU and the second sub-lens unit 20BU. In other words, the first sub-lens group 20A can be used to sufficiently correct axial chromatic aberration for the observing mode through the eyepiece, and the second sub-lens group 20B can be used to sufficiently correct field curvature in the first lens group 10 for the photographing mode to photograph a target object. The combination of the first lens group 10 and the first sub-lens group 20A is arranged to have positive power, and the combination of the first lens group 10 and the second sub-lens group 20B is also arranged to have positive power. On the other hand, the first sub-lens group 20A and the second sub-lens group 20B can be arranged to have either positive or negative power according to the power of the first lens group 10. Furthermore, each of the first lens group 10, and the first sub-lens group 20A and the second sub-lens group 20B is composed of a combination of positive lens elements and negative lens elements. In particular, it is more practical to form these lens groups by the combination of a single positive lens element and a single negative lens element.

Coupling mechanisms 10M and 20M are provided on the image-side of the first lens unit 10U, and on the object-side of the first/second sub-lens units 20AU and 20BU, in order to couple or uncouple the first lens unit 10U and the first sub-lens unit 20AU or the second sub-lens unit 20BU. The coupling mechanisms 10M and 20M can be a screw mechanism or other mounting mechanisms per se known.

Condition (1) is for attaining a reduced cost by employing an inexpensive glass material for the large-diameter positive lens element of the first lens group. For the positive lens element of the first lens group 10, if a low dispersion special glass which has the Abbe number of a glass material $v_{I+}$ exceeding the upper limit of the condition (1) is used, the cost increases.

Condition (2) is for attaining sufficient correction of the secondary spectrum of axial chromatic aberrations by employing low dispersion glass for the positive lens element in the first sub-lens group 20A which is used for correcting chromatic aberration. If $v_{II+}$ exceeds the lower limit, the secondary spectrum of axial chromatic aberrations increases, so that sufficient performance of a telescopic objective lens system cannot be obtained.

Condition (3) is introduced in order to achieve both low cost and sufficient performance by optimizing the positive power of the first lens group 10 when combined with the first sub-lens group 20A which is used for correcting chromatic aberration. If $f_I/f$ exceeds the lower limit, the power of the first lens group 10 becomes too strong, so that the first sub-lens group 20A can not properly contribute to the correcting of axial chromatic aberration; and consequently, the secondary spectrum of axial chromatic aberrations of the entire lens system cannot sufficiently be reduced. On the other hand, if $f_I/f$ exceeds the upper limit, the diameter of the first sub-lens group 20A which employs low dispersion glass for a positive lens element becomes too large due to the power of the first lens group 10 being too weak; and hence, the cost increases.

Condition (4) is introduced for the refractive index of the positive lens element of the second sub-lens group 20B which is used to correct field curvature. When the refractive index of the positive lens element is determined as high as condition (4), field curvature can be corrected. If $n_{II+}$ exceeds the lower limit, the Petzval sum of the entire lens system will positively increase too much, and hence, field curvature is made larger.

Condition (5) is introduced to correct field curvature by setting the refractive index of the negative lens element of the second sub-lens group 20B to a low value with respect to the refractive index of the positive lens element being set to a high value according to condition (4). If $n_{II-}/n_{II+}$ exceeds the lower limit, the Petzval sum of the entire lens system cannot be made smaller, and hence, field curvature is made larger.

Specific numerical data of the embodiments will be described below via the tables and diagrams. In the diagrams of chromatic aberration represented by spherical aberrations, the solid lines and the two types of dotted lines respectively indicate chromatic aberrations with respect to the d, g and C lines. Also, in the diagrams of lateral chromatic aberration, the solid lines and the two types of dotted lines respectively indicate lateral chromatic aberrations with respect to the d, g and C lines. S designates the sagittal image, and M designates the meridional image. $F_{NO}$ designates the F-number, f designates the focal length of the entire lens system, W designates the incident angle, and $f_B$ designates the back focal distance. R designates the radius of curvature of each lens surface, D designates the lens thickness or distance, $N_d$ designates refractive index with respect to the d-line, $v_d$ designates the Abbe number.

First Embodiment

FIG. 1 is a lens arrangement of the first embodiment showing the combination of the common first lens group 10 and the first sub-lens group 20A which is used to correct chromatic aberration. FIGS. 2A, 2B, 2C and 2D are aberration diagrams thereof. The first lens group 10 includes a bi-convex lens element 11 and a bi-concave lens element 12, in this order from the object. The first sub-lens group 20A includes a bi-convex lens element 21 and a bi-concave lens element 22, in this order from the object.

FIG. 3 is a lens arrangement of the first embodiment showing the combination of the common first lens group 10 and a second sub-lens group 20B which is used to correct field curvature. FIGS. 4A, 4B, 4C and 4D are aberration diagrams thereof. The second sub-lens group 20B includes a bi-convex lens element 23 and the bi-concave lens element 24, in this order from the object.

Tables 1 and 2 show the numerical data of the first embodiment. Surface Nos. 1 through 4 show the numerical data for the first lens group 10 which is common in both Tables 1 and 2. Surface Nos. 5 through 8 of Table 1 are the numerical data for the first sub-lens group 20A used for correcting chromatic aberration. Surface Nos. 5 through 8 of Table 2 are the numerical data for the second sub-lens group 20B used for correcting field curvature.

TABLE 1

$F_{NO} = 1:6.7$
f = 99.88
W = 2.5°
$f_B$ = 57.93

| Surface No. | R | D | $N_d$ | $v_d$ |
|---|---|---|---|---|
| 1 | 49.284 | 2.00 | 1.51633 | 64.1 |
| 2 | −109.887 | 0.10 | — | — |
| 3 | −99.927 | 1.50 | 1.62004 | 36.3 |
| 4 | 251.140 | 50.00 | — | — |
| 5 | 33.451 | 1.20 | 1.49700 | 81.6 |
| 6 | −31.757 | 1.76 | — | — |
| 7 | −27.190 | 0.80 | 1.51633 | 64.1 |
| 8 | 60.567 | — | — | — |

TABLE 2

$F_{NO} = 1:6.7$
f = 100.04
W = 2.5°
$f_B$ = 45.02

| Surface No. | R | D | $N_d$ | $v_d$ |
|---|---|---|---|---|
| 1 | 49.284 | 2.00 | 1.51633 | 64.1 |
| 2 | −109.887 | 0.10 | — | — |
| 3 | −99.927 | 1.50 | 1.62004 | 36.3 |
| 4 | 251.140 | 73.85 | — | — |
| 5 | 22.545 | 1.40 | 1.62299 | 58.2 |
| 6 | −34.807 | 0.46 | — | — |
| 7 | −28.556 | 0.70 | 1.53172 | 48.9 |
| 8 | 23.859 | — | — | — |

Second Embodiment

FIG. 5 is a lens arrangement of the second embodiment showing the combination of the common first lens group 10 and the first sub-lens group 20A which is used to correct chromatic aberration. FIGS. 6A, 6B, 6C and 6D are aberration diagrams thereof. The first lens group 10 include a bi-convex lens element 13 and a bi-concave lens element 14, in this order from the object, which are cemented. The first sub-lens group 20A includes a bi-convex lens element 25 and the bi-concave lens element 26, in this order from the object, which are cemented.

Figure 7:
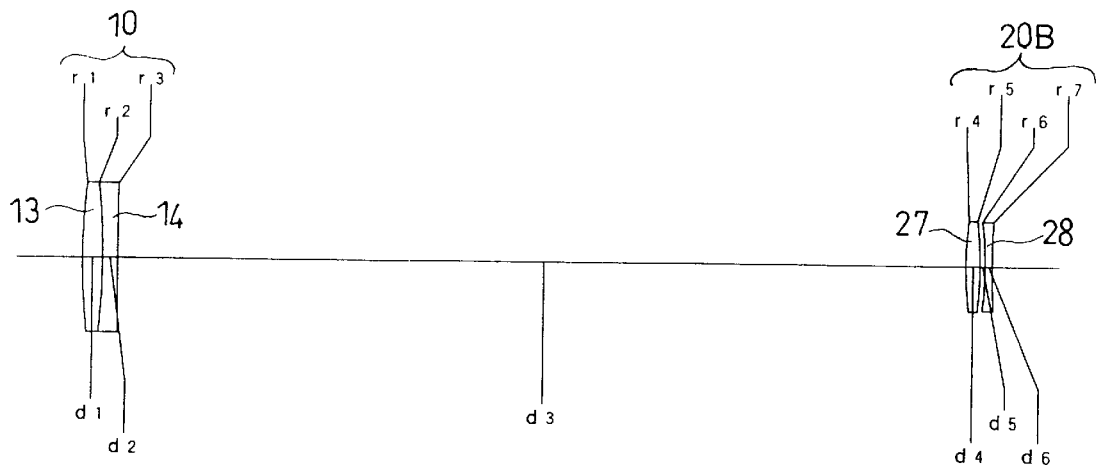
FIG. 7 is a lens arrangement of the second embodiment of the present invention in which the combination of the common first lens group and the second sub-lens group for correcting field curvature is shown.
Figures 8A, 8B, 8C, 8D:
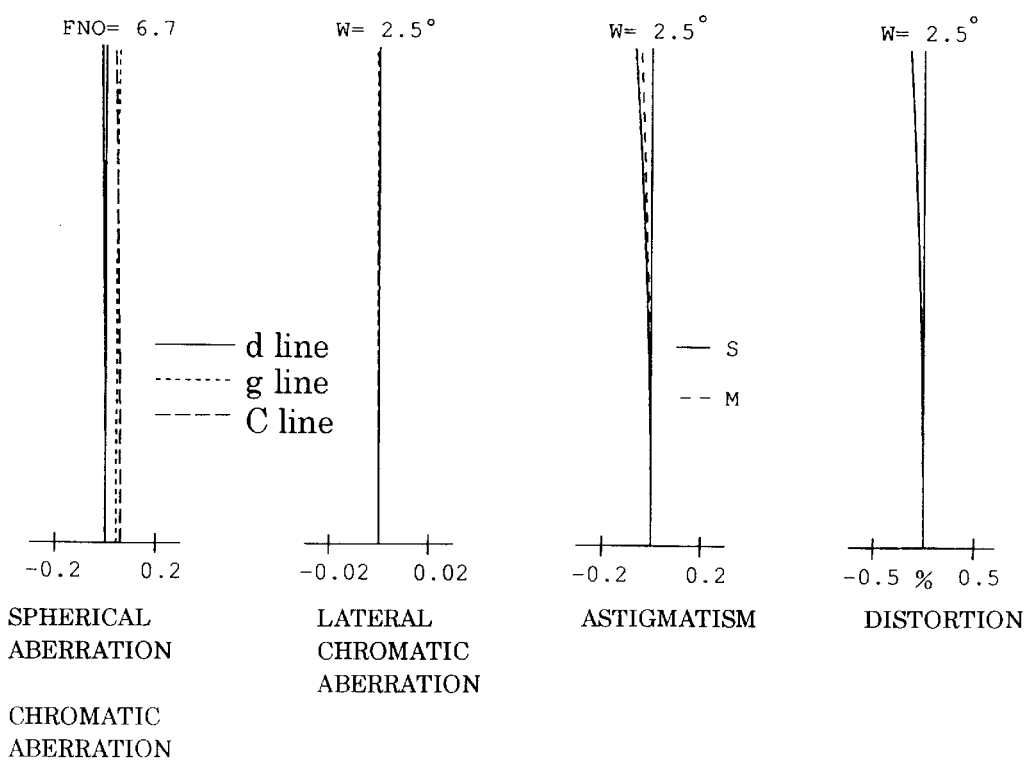
FIGS. 8A, 8B, 8C and 8D are aberration diagrams of the lens arrangement of FIG. 7.

FIG. 7 is a lens arrangement of the second embodiment showing the combination of the common first lens group 10 and the second sub-lens group 20B which is used to correct field curvature. FIGS. 8A, 8B, 8C and 8D are aberration diagrams thereof. The second sub-lens group 20B includes a bi-convex lens element 27 and the bi-concave lens element 28.

Tables 3 and 4 show the numerical data of the second embodiment. Surface Nos. 1 through 3 show the numerical data for the first lens group 10 which is common in both Tables 3 and 4. Surface Nos. 4 through 6 of Table 3 are the numerical data for the first sub-lens group 20A used for correcting chromatic aberration. Surface Nos. 4 through 7 of Table 4 are the numerical data for the second sub-lens group 20B used for correcting field curvature.

TABLE 3

$F_{NO} = 1:6.7$
f = 99.79
W = 2.5°
$f_B$ = 43.75

| Surface NO. | R | D | $N_d$ | $v_d$ |
|---|---|---|---|---|
| 1 | 63.832 | 2.00 | 1.48749 | 70.2 |
| 2 | −70.092 | 1.50 | 1.56732 | 42.8 |
| 3 | 796.711 | 91.15 | — | — |
| 4 | 27.726 | 1.00 | 1.49700 | 81.6 |
| 5 | −22.049 | 0.70 | 1.51633 | 64.1 |
| 6 | 64.008 | — | — | — |

TABLE 4

$F_{NO} = 1:6.7$
f = 100.23
W = 2.5°
$f_B$ = 45.89

| Surface No. | R | D | $N_d$ | $v_d$ |
|---|---|---|---|---|
| 1 | 63.832 | 2.00 | 1.48749 | 70.2 |
| 2 | −70.092 | 1.50 | 1.56732 | 42.8 |
| 3 | 796.711 | 85.58 | — | — |
| 4 | 39.099 | 1.40 | 1.62299 | 58.2 |
| 5 | −39.099 | 0.51 | — | — |
| 6 | −34.845 | 0.70 | 1.56732 | 42.8 |
| 7 | 72.306 | — | — | — |

Third embodiment

Figure 9:
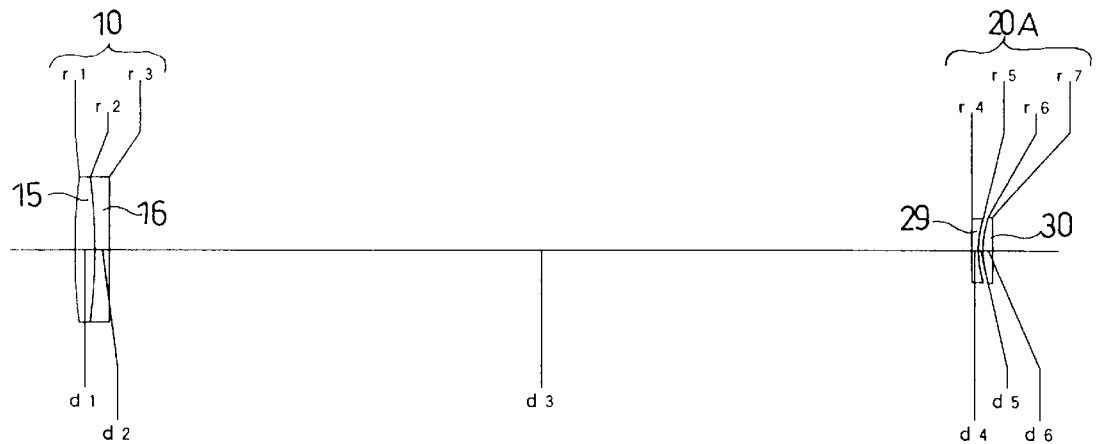
FIG. 9 is a lens arrangement of the third embodiment of the present invention in which the combination of the common first lens group and the first sub-lens group for correcting chromatic aberration is shown.
Figures 10A, 10B, 10C, 10D:
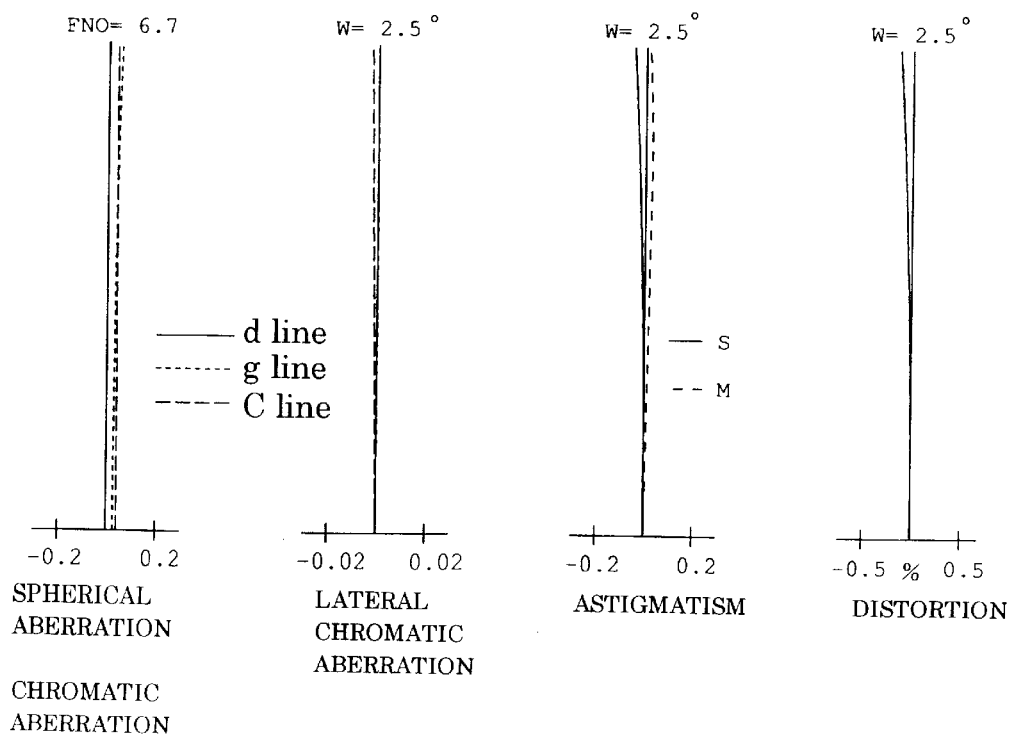
FIGS. 10A, 10B, 10C and 10D are aberration diagrams of the lens arrangement of FIG. 9.

FIG. 9 is a lens arrangement of the third embodiment showing the combination of the common first lens group 10 and the first sub-lens group 20A which is used to correct chromatic aberration. FIGS. 10A, 10B, 10C and 10D are aberration diagrams thereof. The first lens group 10 includes a bi-convex lens element 15 and a negative meniscus lens element 16, in this order from the object, which are cemented. The first sub-lens group 20A includes a negative meniscus lens element 29 and the bi-convex lens element 30.

Figure 11:
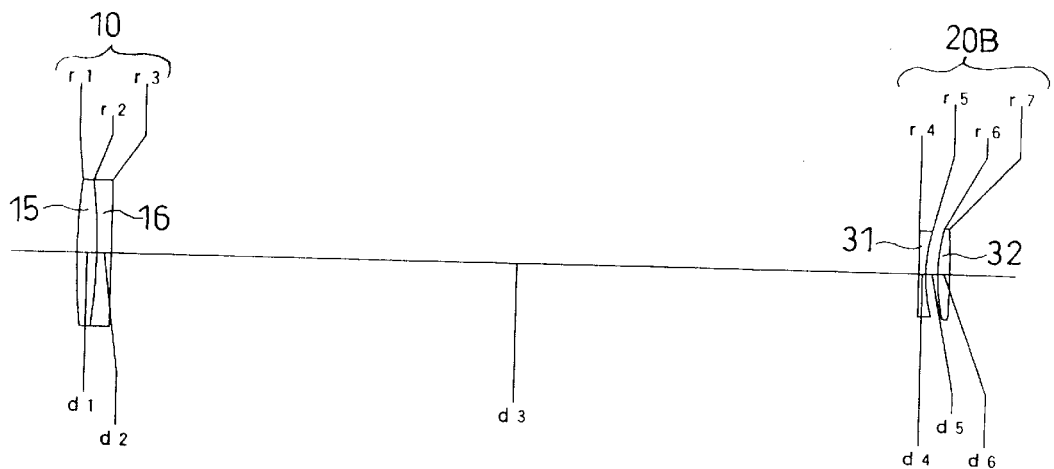
FIG. 11 is a lens arrangement of the third embodiment of the present invention in which the combination of the common first lens group and the second sub-lens group for correcting field curvature is shown.
Figures 12A, 12B, 12C, 12D:
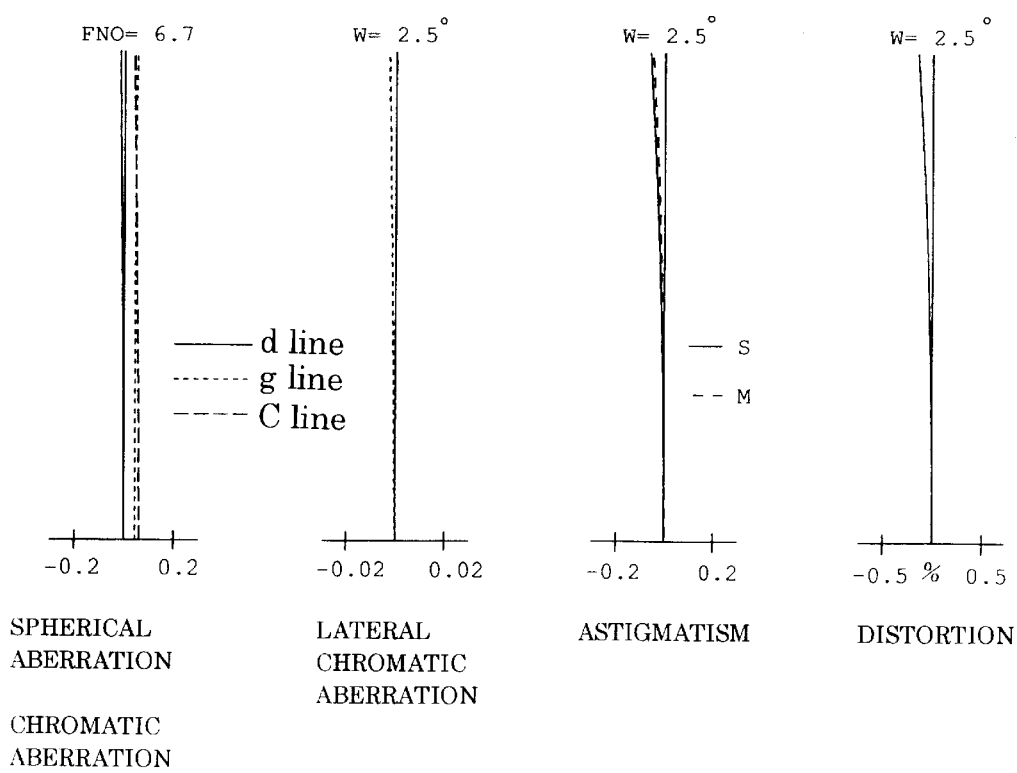
FIGS. 12A, 12B, 12C and 12D are aberration diagrams of the lens arrangement of FIG. 11.

FIG. 11 is a lens arrangement of the third embodiment showing the combination of the common first lens group 10 and the second sub-lens group 20B which is used to correct field curvature. FIGS. 12A, 12B, 12C and 12D are aberration diagrams thereof. The second sub-lens group 20B includes a bi-concave lens element 31 and a bi-convex lens element 32, in this order from the object.

Tables 5 and 6 show the numerical data of the third embodiment. Surface Nos. 1 through 3 show the numerical data for the first lens group 10 which is common in both Tables 5 and 6. Surface Nos. 4 through 7 of Table 5 are the numerical data for the first sub-lens group 20A used for correcting chromatic aberration. Surface Nos. 4 through 7 of Table 6 are the numerical data for the second sub-lens group 20B used for correcting field curvature.

TABLE 5

$F_{NO} = 1:6.7$
$f = 99.99$
$W = 2.5°$
$f_B = 43.27$

| Surface No. | R | D | $N_d$ | $v_d$ |
|---|---|---|---|---|
| 1 | 71.838 | 2.00 | 1.48749 | 70.2 |
| 2 | −60.104 | 1.50 | 1.56732 | 42.8 |
| 3 | −767.180 | 88.54 | — | — |
| 4 | 82.554 | 0.70 | 1.51633 | 64.1 |
| 5 | 11.155 | 0.48 | — | — |
| 6 | 11.458 | 1.00 | 1.49700 | 81.6 |
| 7 | −102.489 | — | — | — |

TABLE 6

$F_{NO} = 1:6.7$
$f = 100.09$
$W = 2.5°$
$f_B = 47.84$

| Surface No. | R | D | $N_d$ | $v_d$ |
|---|---|---|---|---|
| 1 | 71.838 | 2.00 | 1.48749 | 70.2 |
| 2 | −60.104 | 1.50 | 1.56732 | 42.8 |
| 3 | −767.180 | 82.55 | — | — |
| 4 | −329.030 | 0.70 | 1.54814 | 45.8 |
| 5 | 17.535 | 1.22 | — | — |
| 6 | 19.589 | 1.20 | 1.65160 | 58.5 |
| 7 | −95.574 | — | — | — |

The numerical values of each condition for each embodiment are listed in Table 7.

TABLE 7

|  | Embodiment(1) | (2) | (3) |
|---|---|---|---|
| Condition (1) | 64.1 | 70.2 | 70.2 |
| Condition (2) | 81.6 | 81.6 | 81.6 |
| Condition (3) | 1.519 | 1.725 | 1.613 |
| Condition (4) | 1.623 | 1.623 | 1.652 |
| Condition (5) | 0.944 | 0.966 | 0.937 |

As can be seen in Table 7, each embodiment satisfies conditions (1) through (5). Moreover, as can be seen in the aberration diagrams, axial chromatic aberrations in particular have been sufficiently corrected through the combination of the first lens group 10 and the first sub-lens group 20A which is used for the observing mode through the eyepiece. Also, astigmatism (field curvature) in particular has been sufficiently corrected through the combination of the first lens group 10 and the second sub-lens group 20B which is used for the photographic mode to photograph a target object.

As can be understood from the above, a telescopic objective lens system with wider angle-of-view has been provided, at a low cost, in which axial chromatic aberrations can be sufficiently corrected in an observing mode through the eyepiece, and field curvature can be sufficiently corrected in a photographing mode to photograph a target object.

What is claimed is:

1. A telescopic objective lens system comprising:

a positive first lens group and a second lens group, in this order from an object, said second lens group comprising a first sub-lens group and a second sub-lens group, which are selectively attachable to said first lens group;

wherein said first sub-lens group is attached to said first lens group to correct axial chromatic aberration, and said second sub-lens group is attached to said first lens group to correct field curvature.

2. The telescopic objective lens system according to claim 1, further comprising:

a first lens unit, comprising said first lens group;

a first sub-lens unit, comprising said first sub-lens group;

a second sub-lens unit, comprising said second sub-lens group;

a first coupling mechanism, provided on an image-side of said first lens unit, and a second coupling mechanism, provided on the object-side of said first and second sub-lens units;

wherein said first coupling mechanisms and one of said second coupling mechanisms removably attach said first lens unit and one of said first and second sub-lens units.

3. The telescopic objective lens system according to claim 1, wherein each of said first lens group, said first sub-lens group and said second sub-lens group comprises a single positive lens element and a single negative lens element.

4. The telescopic objective lens system according to claim 1, wherein each of said first lens group and said first sub-lens group comprises a positive lens element and a negative lens element which are made of glass having different dispersion values, and said telescopic objective lens system satisfies the following conditions:

$v_{I+} < 80$ $v_{II+} > 70$ $1.1 < f_I/f < 2.0$ $v_{I+}$ designates the Abbe number of the material forming said positive lens element in said first lens group;

$v_{II+}$ designates the Abbe number of the material forming said positive lens element in said second lens group;

$f_I$ designates the focal length of said first lens group;

f designates the focal length of the entire lens system.

5. The telescopic objective lens system according to claim 1, wherein each of said first lens group and said second sub-lens group comprises a positive lens element and a negative lens element which are made of glass having different dispersion values, and said telescopic objective lens system satisfies the following conditions:

$n_{II+} > 1.55$ $n_{II-}/n_{II+} < 1.0$ wherein $n_{II+}$ designates the refractive index, with respect to the d line, of said positive lens element in said second sub-lens group;

$n_{H-}$ designates the refractive index, with respect to the d line, of said negative lens element in said second lens group.

6. The telescopic objective lens system according to claim 1, said first lens group and said first sub-lens group correcting axial chromatic aberration for observation through an eyepiece.

7. The telescopic objective lens system according to claim 1, said first lens group and said second sub-lens group correcting field curvature for photographing.

8. The telescopic objective lens system according to claim 1, said first sub-lens group and said second sub-lens group having one of a positive and a negative power according to a power of said first lens group.

9. The telescopic objective lens system according to claim 2, said first coupling mechanism and said second coupling mechanism comprising screw mechanisms.

10. The telescopic objective lens system according to claim 1, a focal length of said first lens group and said first sub-lens group being substantially equal to a focal length of said first lens group and said second sub-lens group.

* * * * *

UNITED STATES PATENT AND TRADEMARK OFFICE
CERTIFICATE OF CORRECTION

PATENT NO.    : 6,212,016 B1
DATED         : April 3, 2001
INVENTOR(S)   : Tetsuya Abe It is certified that error appears in the above-identified patent and that said Letters Patent is hereby corrected as shown below:

<u>Title page,</u>
Item [73], Assignee: "Asahi Kogako Kogyo Kabushiki Kaisha, Tokyo (JP)" should be -- Asahi Kogaku Kogyo Kabushiki Kaisha, Tokyo, (JP) --

Signed and Sealed this

Twentieth Day of August, 2002

Attest:

JAMES E. ROGAN
*Attesting Officer*  *Director of the United States Patent and Trademark Office*